US007296824B2

(12) United States Patent  
Yasui et al.

(10) Patent No.: US 7,296,824 B2
(45) Date of Patent: Nov. 20, 2007

(54) VEHICLE FRONT BODY STRUCTURE

(75) Inventors: Ken Yasui, Wako (JP); Shigeto Yasuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 377 days.

(21) Appl. No.: 10/956,709

(22) Filed: Oct. 1, 2004

(65) Prior Publication Data

US 2005/0077711 A1  Apr. 14, 2005

(30) Foreign Application Priority Data

Oct. 8, 2003  (JP) .............................. 2003-349382

(51) Int. Cl.
B62D 25/08 (2006.01)
B62D 21/00 (2006.01)
(52) U.S. Cl. ............. 280/784; 296/187.09; 296/203.02
(58) Field of Classification Search ................ 280/184, 280/784; 296/187.03, 187.09, 203.02, 203.01
See application file for complete search history.

(56) References Cited

U.S. PATENT DOCUMENTS

| | | | | |
|---|---|---|---|---|
| 2,139,750 A | * | 12/1938 | Hicks ..................... | 296/203.02 |
| 2,380,031 A | * | 7/1945 | Deisley et al. ......... | 296/203.02 |
| 3,819,224 A | * | 6/1974 | Casey et al. ........... | 296/187.09 |
| 4,909,565 A | * | 3/1990 | Harasaki et al. ....... | 296/187.09 |
| 5,314,229 A | * | 5/1994 | Matuzawa et al. ..... | 296/187.09 |
| 5,876,078 A | * | 3/1999 | Miskech et al. ............ | 293/133 |
| 6,068,330 A | * | 5/2000 | Kasuga et al. ......... | 296/187.09 |
| 6,170,906 B1 | * | 1/2001 | Kasuga ................... | 296/203.02 |
| 6,250,710 B1 | * | 6/2001 | Matsuzaki ............. | 296/203.02 |
| 6,332,642 B1 | | 12/2001 | Hanyu | |
| 6,361,092 B1 | * | 3/2002 | Eagle et al. ................ | 293/102 |
| 6,409,255 B2 | * | 6/2002 | Tilsner et al. .......... | 296/187.09 |
| 6,416,119 B1 | * | 7/2002 | Gericke et al. ............. | 296/205 |
| 6,598,933 B2 | * | 7/2003 | Taguchi et al. ........ | 296/203.02 |
| 6,793,275 B1 | * | 9/2004 | Chernoff et al. ....... | 296/193.11 |
| 6,860,547 B2 | * | 3/2005 | Winter et al. .......... | 296/193.02 |
| 6,893,065 B2 | * | 5/2005 | Seksaria et al. ............ | 293/133 |
| 6,921,126 B2 | * | 7/2005 | Suh et al. .................... | 296/192 |
| 6,948,769 B2 | * | 9/2005 | Borkowski et al. .... | 296/203.02 |
| 7,052,078 B2 | * | 5/2006 | Akasaka ..................... | 296/191 |
| 2003/0107241 A1 | * | 6/2003 | Ritchie et al. .............. | 296/188 |

FOREIGN PATENT DOCUMENTS

| | | |
|---|---|---|
| JP | 63-263175 | 10/1988 |
| JP | 2-107569 | 8/1990 |
| JP | 3-15787 | 2/1991 |
| JP | 2003-40142 | 2/2003 |
| JP | 2003-040142 | 2/2003 |

* cited by examiner

*Primary Examiner*—Paul N. Dickson
*Assistant Examiner*—Joseph Rocca
(74) *Attorney, Agent, or Firm*—Hamre, Schumann, Mueller & Larson, P.C.

(57) ABSTRACT

A vehicle front body structure includes an upper member extending from the lower end of a front pillar in a forward direction of a vehicle body and disposed outward a front side frame in a transverse direction of the vehicle body. The upper member has a substantially rectilinear configuration and is arranged to slope upward in a rearward direction of the vehicle body so that a load applied to a front end portion of the upper member can be born by the front pillar.

2 Claims, 7 Drawing Sheets

VEHICLE FRONT BODY STRUCTURE

FIELD OF THE INVENTION

The present invention relates generally to a front body structure for vehicles, and more particularly to a vehicle front body structure having an upper member extending forwardly from the lower end of a front pillar.

BACKGROUND OF THE INVENTION

Vehicle front body structures of the type having an apron frame (upper member) disposed outward of a front side frame and extending along an upper portion of a front wheel house are known heretofore, as disclosed, for example, in Japanese Patent (JP-B2) No. 2,516,212.

As shown in FIG. 7 hereof, the disclosed vehicle front body structure 100 includes a front side frame 103 extending longitudinally of the vehicle body and disposed on a lower side edge of a wheel house 102, and an apron frame (upper member) 105 disposed outwardly of the front side frame 101. The apron frame 105 has a central portion 106 curved or bent into a curvature extending along an upper edge of the wheel house 101. The thus curved central portion 106 has a steep down-slope when viewed in a forward direction of the vehicle body.

With this arrangement, when the apron frame 105 is subjected to a backward force or load acting on a front end 108 thereof, as indicated by a profiled arrow shown in FIG. 7, the curved central portion 106 of the apron frame 105 will undergo yielding or deformation in a radial inward direction of the wheel house 101. Thus, the apron frame 105 with curved central portion 106 does not contribute to distribution of the load to a front pillar disposed rearward of the apron frame 105.

Another example of the known vehicle front body structure is disclosed in Japanese Patent Laid-open Publication (JP-A) No. 2003-40142. As shown in FIG. 8 hereof, the disclosed vehicle front body structure 110 includes a front side frame 111 extending in a longitudinal direction of the vehicle body, and an upper member 114 extending forwardly on the down grade from the lower end of a front pillar 112 and having a front end 116 connected via a connecting member 117 and a side down member 118 to a front end portion 122 of the front side frame 111. The upper member 112 includes a rear end portion 113 extending forwardly from the lower end of the front pillar 112, a downwardly inclined central portion 119 extending forwardly from a front end of the rear end portion 113, and a substantial vertical front end portion 121 extending vertically downward from a front end of the central portion 119. A lower end of the vertical end portion 121 forms the front end 116 of the upper member 114 that is connected via the connecting member 117 and the side down member 118 to the front end portion 122 of the front side frame 111.

By thus connecting the vertical front end portion 121 to the front side frame 111 via the connecting member 117 and the side down member 118, the upper member 114 is structurally reinforced. However, due to the use of the connecting member 117 and the side down member 118, a corresponding increase in weight of the entire vehicle front body structure 110 is inevitable. Additionally, due to the presence of the connecting member 117 and the side down member 118, a space 123 provided on a lateral outer side of the front end portion 122 of the front side frame 111 is relatively small and this poses a certain limit or restriction to the design and arrangement of a vehicle part such as a front fog light adapted to be installed in the space 123.

SUMMARY OF THE INVENTION

It is, therefore, an objective of the present invention to provide a vehicle front body structure, which is able to distribute a load applied to the front end of an upper member to a front pillar with high efficiencies, can reduce the overall weight of the vehicle body, and has a relatively high degree of freedom in designing and arranging a vehicle part such as a front fog light.

According to the invention, there is provided a front body structure for a vehicle, which comprises a front side frame extending in a longitudinal direction of a body of the vehicle, a front pillar disposed upwardly and rearward of the front side frame, and an upper member extending from a lower end of the front pillar in a forward direction of the vehicle body, the upper member being disposed outward of the front side frame in a transverse direction of the vehicle body. The upper member has a substantially rectilinear configuration and is arranged to slope upward in a backward direction of the vehicle body so that a load applied to a front end portion of the upper member can be born by the front pillar.

By virtue of the rectilinear configuration, the upper member is rigid enough to withstand a force or load applied to the front end portion thereof in a backward direction of the vehicle body. Additionally, since the upper member is arranged to slope upward toward the lower end of the left front pillar, the load applied to the front end portion of the upper member is effectively distributed through the upper member to the front pillar and eventually born by the front pillar. The load can thus be absorbed efficiently. Furthermore, since the upper member of the substantially rectilinear configuration is rigid in itself against the load acting in the backward direction of the vehicle body, it is no longer necessary to provide a reinforcing member to the front end portion of the upper member. This contributes to the reduction of the overall weight of the vehicle front body structure and provides a relatively large space in the vicinity of the front end portion of the upper member for installation of a front fog light or the like vehicle parts or accessories.

Preferably, the upper member has a front end enlarged in a vertical direction and having a larger height than the remaining part of the upper member. By thus enlarging the vertical dimension or height of the front end, the upper member now has a relatively large range of abutment relative to a structural part of an oncoming vehicle, which forms a fore end of the oncoming vehicle at the time of a collision and which varies in height depending on the type and/or model of the oncoming vehicle. This arrangement ensures that the vehicle front body structure can achieve shock-absorbing operation with high efficiency.

In one preferred form of the invention, the front end portion of the upper member is flared in vertical direction toward the vertically enlarged front end.

The upper member may have a front part including the front end portion, and a rear part contiguous with the front part and including a rear end portion connected to the lower end of the front pillar. In this instance, the front part and the rear part of the upper member are curved downward and upward, respectively, to a limited extent that the upper member as a whole extends substantially linearly on the up grade from the front end portion to the rear end portion of the upper member.

The rear body structure may further comprise a sensor for activating an air-bag module, the sensor being disposed on the upper member in the vicinity of the front end portion thereof, and the front end portion of the upper member being located rearward of a front end of the front side frame. With this arrangement, the sensor is not sensitive to a load applied to a front end of the vehicle front body structure until the load causes the font end portion of the upper member to undergo deformation or yielding subsequent to complete deformation or yielding of the front end portion of the front side frame. It is, therefore, possible to prevent accidental activation of the air-bag module which may otherwise occur when the vehicle front body structure is subjected to a relatively small impact force.

BRIEF DESCRIPTION OF THE DRAWINGS

A preferred structural embodiment of the present invention will be described in detail herein below, by way of example only, with the reference to the accompanying drawings, in which.

DETAILED DESCRIPTION OF THE PREFERRED EMBODIMENT

Figure 1:
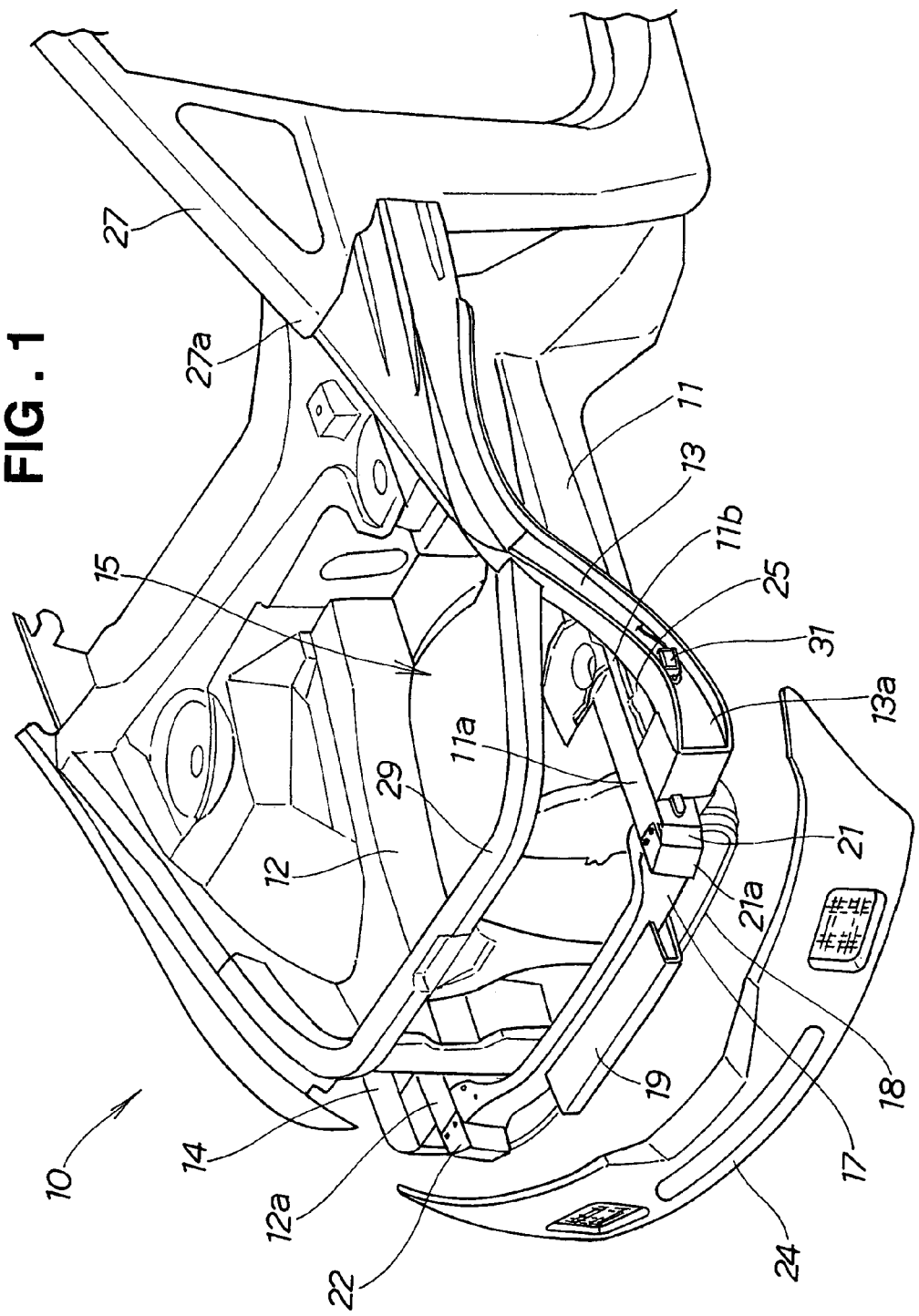
FIG. 1 is a perspective view showing a vehicle front body structure according to an embodiment of the present invention.

Referring now to the drawings and FIG. 1 in particular, there is shown in perspective a front body structure 10 of a motor vehicle according to an embodiment of the present invention. The vehicle front body structure 10 generally comprises left and right front side frames 11 and 12 extending longitudinally of a body of the motor vehicle and disposed on left and right sides, respectively, of a front portion of the vehicle body, and left and right upper members 13 and 14 disposed outward of and above the left and right front side frames 11, 12, respectively, so as to form, together with the front side frames 11, 12, a skeleton framework of an engine room 15.

The vehicle front body structure 10 further includes a bumper beam 17 extending between front end portions 11a, 12a of the left and right front side frames 11, 12, a front bulkhead lower cross member 18 disposed below the bumper beam 17 and extending between the front end portions 11a, 12a of the left and right front side frames 11, 12, a center extension member 19 disposed on a central portion of a front surface of the bumper beam 17, left and right extension member 21 and 22 projecting forwardly from the respective front end portions 11a, 12a of the left and right front side frames 11, 12, and a front bumper 24 disposed forwardly of the left, center and right extension members 21, 19, 22. A bulkhead upper frame 29 of generally U-shaped configuration is disposed between central portions of the left and right upper members 13, 14.

The left front side frame 11, the left upper member 13, and the left extension member 21 are symmetrical with the right front side frame 12, the right upper member 14 and the right extension member 22, respectively, about a longitudinal center line of the vehicle body. In view of the symmetric structure, a description given below will be directed only to the left front side frame 11, the left upper member 13 and the left extension member 21, and description of the right front side frame 12, the right upper member 14, and the right extension member 22 will be omitted.

The left front side frame 11 extends in the longitudinal direction of the vehicle body and has a beaded portion 25 formed by bulging on an outer sidewall 11b along a front part of the left front side frame 11. The left extension member 21 extends forwardly from the front end portion 11a of the left front side frame 11. The front bumper 24 is disposed so as to locate in the vicinity of a front end 21a of the left extension member 21.

A left front pillar 27 is disposed above a rear end of the left front side frame 11. The left front pillar 27 has a lower end 27a from which the left upper member 13 extends forwardly. The left upper member 13 is disposed outward (leftward in FIG. 1) of the left front side frame 11. The left upper member 13 is formed into a substantially straight or rectilinear configuration and arranged to slope upward toward a rear end of the vehicle body so that a load applied to a front end portion 13a of the left upper member 13 can be transmitted through the left upper member 13 to the left front pillar 27 and born by the front pillar 27.

The front end portion 13a of the left upper member 13 is connected to a left end of the bumper beam 17 via a connection member 28 and the left front side frame 11. A sensor 31 for activating an air-bag module (not shown) is disposed in the vicinity of the front end portion 13a of the left upper member 13.

The sensor 31 is an impact sensor which is constructed to detect an impact force applied to the vehicle body and generates a detection signal when it detects a preset impact force. The detection signal from the impact sensor 31 is supplied to an electronic control unit, ECU, (not shown), which, on the basis of the detection signal, outputs a signal to activate or deploy the air-bag module.

Figure 2:
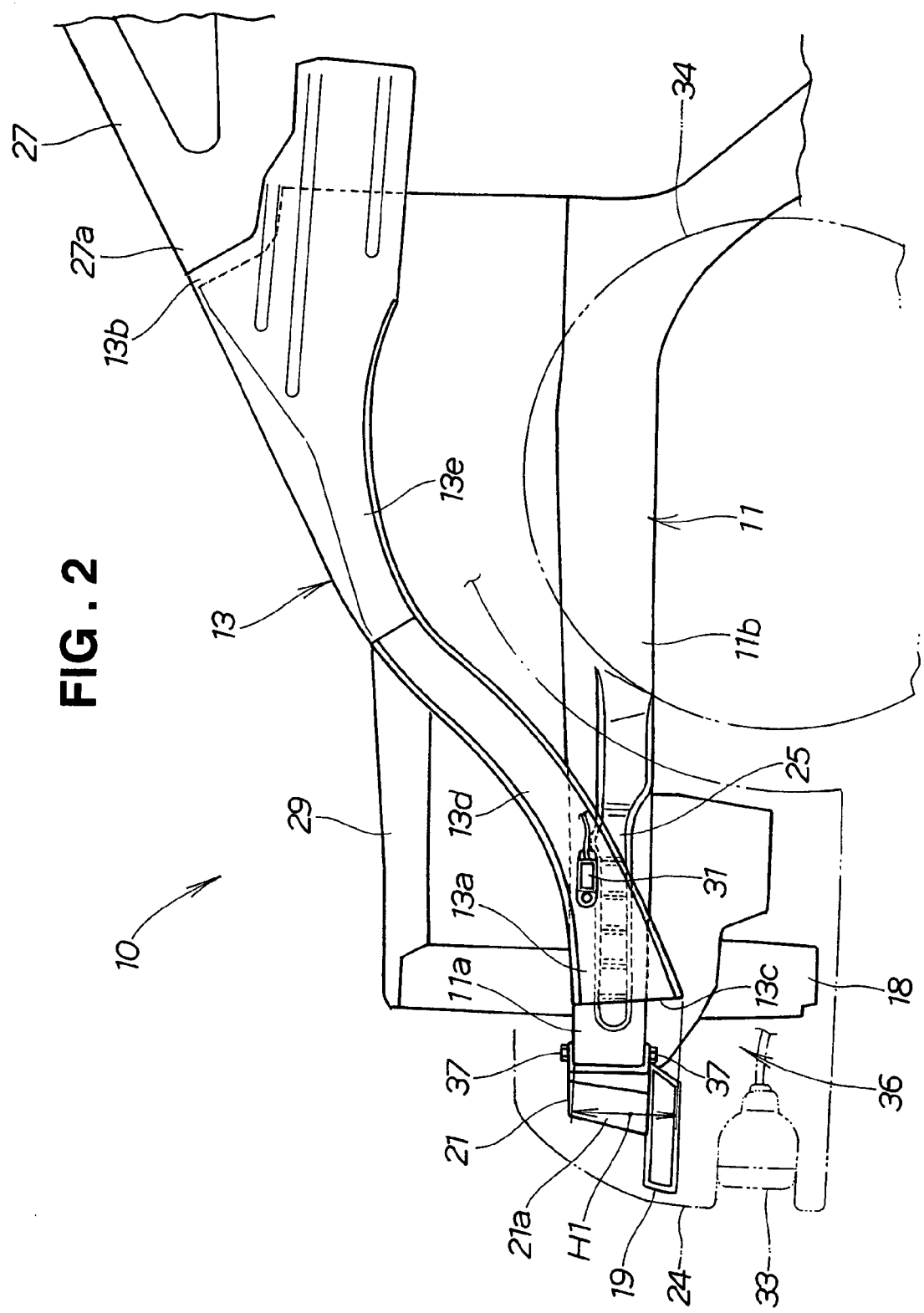
FIG. 2 is a side view of the vehicle front body structure.

FIG. 2 shows in side view the vehicle front body structure 10 of the invention. As shown in this figure, the left front pillar 27 is disposed above the rear end of the left front side frame 11, and the left upper member 13 extends forwardly from the lower end 27a of the left front pillar 27. The left upper member 13 is disposed outward of the left front side frame 11 in a transverse direction of the vehicle body. The left front side frame 11 extends longitudinally of the vehicle body.

The left upper member 13 has a front part 13d including the front end portion 13a, and a rear part 13e contiguous with the front part 13d and including a rear end portion 13b opposite the front end portion 13a. The front part 13d of the left upper member 13 is slightly curved or bent downward, while the rear part 13e of the left upper member 13 is slightly curved or bent upward. The degrees of bent or curvatures of the front and rear parts 13d, 13e of the left upper member 13 are determined such that the left upper member 13 as a whole has a straight or rectilinear configuration that extends straight or linearly on the up grade from the front end portion 13a attached to front end portion 11a of the left front side frame 11 to the rear end 13b connected to the lower end 27a of the left front pillar 27.

The beaded portion 25 is formed on the outer sidewall 11b of the left lower front frame 11, and the left extension member 21 is attached by a plurality of screws 37 to the front end portion 11a of the left front side frame 11. The left extension member 21 extends forwardly from the front end portion 11a of the left front side frame 11.

The front part 13d of the left upper member 13 is slightly curved downward for the purpose of providing a necessary space above the front end portion 13a of the left upper member 13 for installation of a headlight or the like vehicle accessory. Similarly, the rear part 13e of the left upper member 13 is slightly curved upward for the purpose of providing a necessary space below the upper member 13 for installation of a left front wheel 34. The left upper member 13 is desirably configured to assume a single straight line when viewed in side elevation while providing necessary spaces for installation of the headlight and the left front wheel 34.

By thus forming the left upper member 13 into a substantially straight or rectilinear configuration, the left upper member 13 is made rigid enough to withstand a load applied to the front end portion 13a in a backward direction of the vehicle body. Additionally, since the left upper member 13 is arranged to slope upward toward the lower end 27a of the left front pillar 27, the load applied to the front end portion 13a of the left upper member 13 is effectively distributed through the left upper member 13 to the left front pillar 27 and eventually born by the left front pillar 27.

Furthermore, since the left upper member 13 of the substantially rectilinear configuration is rigid in itself against the load acting in the backward direction of the vehicle body, it is no longer necessary for the vehicle front body structure 10 to provide a reinforcing member to the front end portion 13a of the left upper member 13. Due to the absence of the reinforcing member, the vehicle front body structure 10 is relatively light in weight and has a relatively large space in the vicinity of the front end portion 13a of the left upper member 13, which increases the degree of design freedom in determining the location of vehicle parts or accessories including a front fog light 33.

As is well known, the left upper member 13 is subjected to vertical forces or loads during travel of the vehicle. The left upper member 13 that is formed into a substantially straight or rectilinear configuration is also highly rigid against the vertical loads.

The front end portion 13a of the left upper member 13 is configured such that a vertical dimension or height increases gradually in a direction from a rear end toward a front end 13c of the front end portion 13a. Stated in other words, the front end portion 13a is flared in a vertical direction so that the front end portion has a larger height than the remaining portion of the left upper member 13 and the height of the front end portion 13a is maximum H1 at the front end 13c of the front end portion 13a. By thus enlarging the vertical dimension of the front end 13c of the front end portion 13a, the left upper member 13 can engage or abut with structural parts of various different oncoming vehicles with increased reliability when a collision occurs, as will be understood from a description given below with reference to FIGS. 5A and 5B.

The impact sensor 31 for activating the air-bag module (not shown) is disposed in the vicinity of the front end portion 13 of the left upper member 13. As clearly shown in FIG. 2, the front end 13c of the left upper member 13 is disposed rearward of a front end of the left front side frame 11.

With this arrangement, when the left front side frame 11 is subjected to a backward force or load acting on the front end portion 11a thereof, if the backward force is of a relatively small level just causing slight deformation of the front end portion 11a of the left front side frame 11, the front end portion 13a of the left upper member 13 remains in its original shape and does not undergo any deformation. Since the backward force is absorbed by the front end portion 11a of the front side frame 11 through deformation of the latter, and since the front end portion 13a of the left upper member 13 is free from deformation, the impact sensor 31 is not sensitive to the backward force and remains in the inactive state.

Alternatively, if the backward force acting on the front end portion 11a of the left front side frame 11 is relatively large so that that the front end portion 13a of the left upper member 13 is caused to undergo deformation or yielding subsequent to complete deformation of the front end portion 11a of the left front side frame 11, the impact sensor 31 disposed in the vicinity of the front end portion 13a being deformed is now responsive to the backward force and turns to the active state. The sensor 31 generates a detection signal in response to which the ECU (not shown) generates a signal to activate or deploy the air-bag module (not shown).

Figure 3:
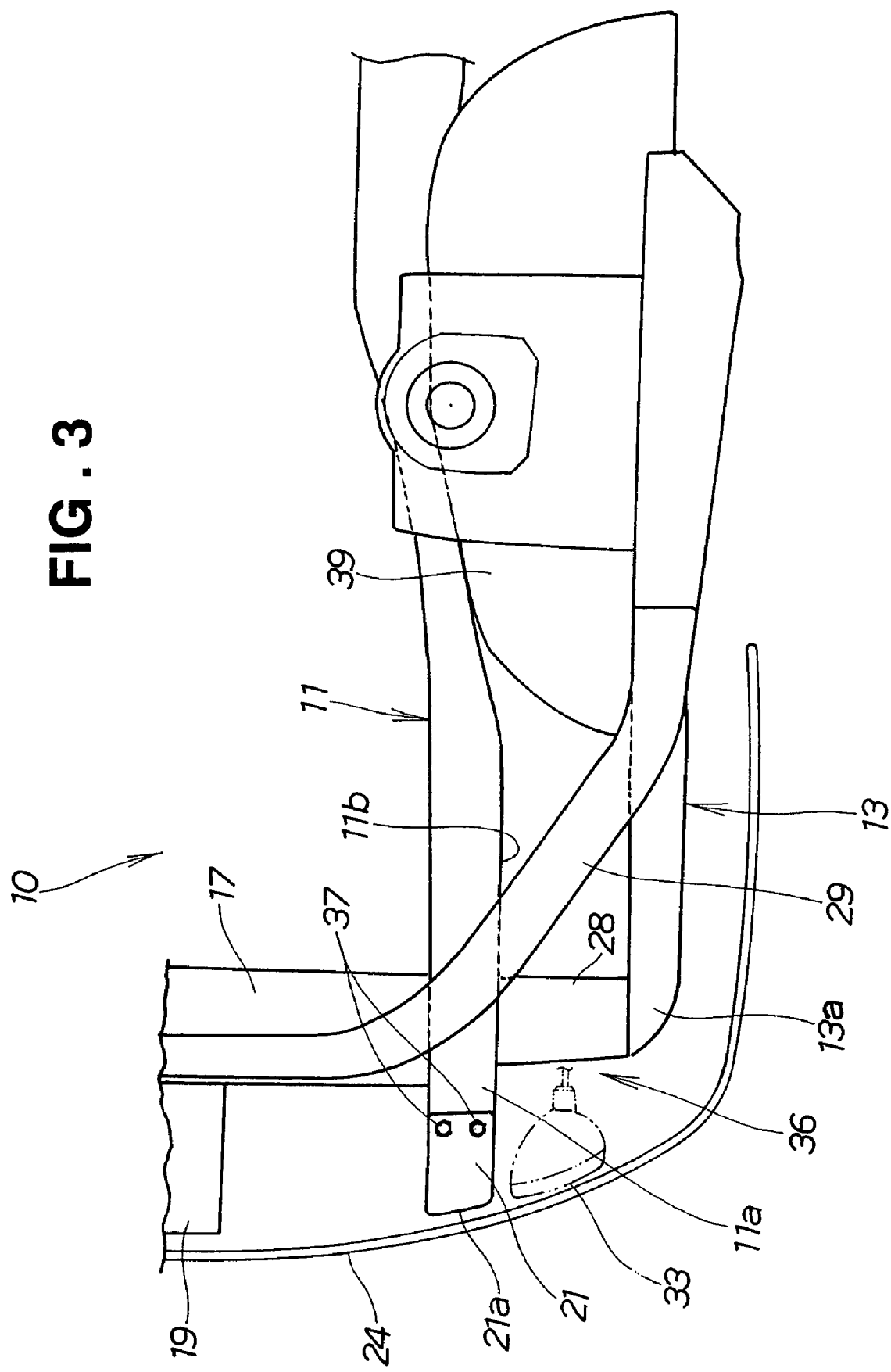
FIG. 3 is a plan view of a left side of the vehicle front body structure.

FIG. 3 shows in plan view a left half of the vehicle front body structure 10 according to the present invention. As shown in this figure, the left front side frame 11 extends longitudinally of the vehicle body, and the left upper member 13 is disposed substantially parallel to and outward of the left front side frame 11. The front end portion 13a of the left upper member 13 is connected via the connection member 28 to the outer sidewall 11b of the left front side frame 11. The bumper beam 17 extends transversely from the front end portion 11a of the left front side frame 11 toward the front end portion 12a (FIG. 1) of the right front side frame 12. The center extension member 19 projects forwardly from a central portion of the bumper beam 17. The left extension member 21 is bolted to the front end portion 11a of the left front side frame 11 and extends forwardly from the front end portion 11a. The front bumper 24 is disposed forwardly of the left extension member 21, the center extension member 19 and the right extension member 22 (FIG. 1). A left front wheel house 39 is provided between the left front side frame 11 and the left upper member 13 for covering an upper part of the left front wheel 34 (FIG. 2).

Figure 4A:
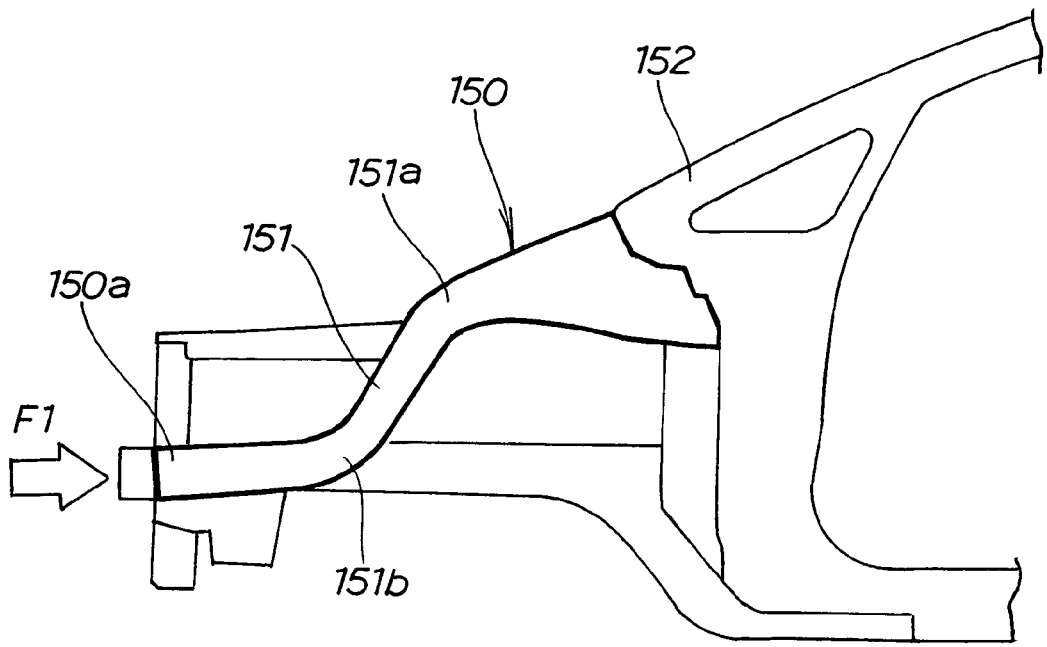
FIGS. 4A and 4B are side views diagrammatically illustrating, for comparative purposes, the behavior of a left upper member according to a comparative example and the behavior of a left upper member according to the invention that are observed when the upper members are subjected to a front end collision.
Figure 4B:
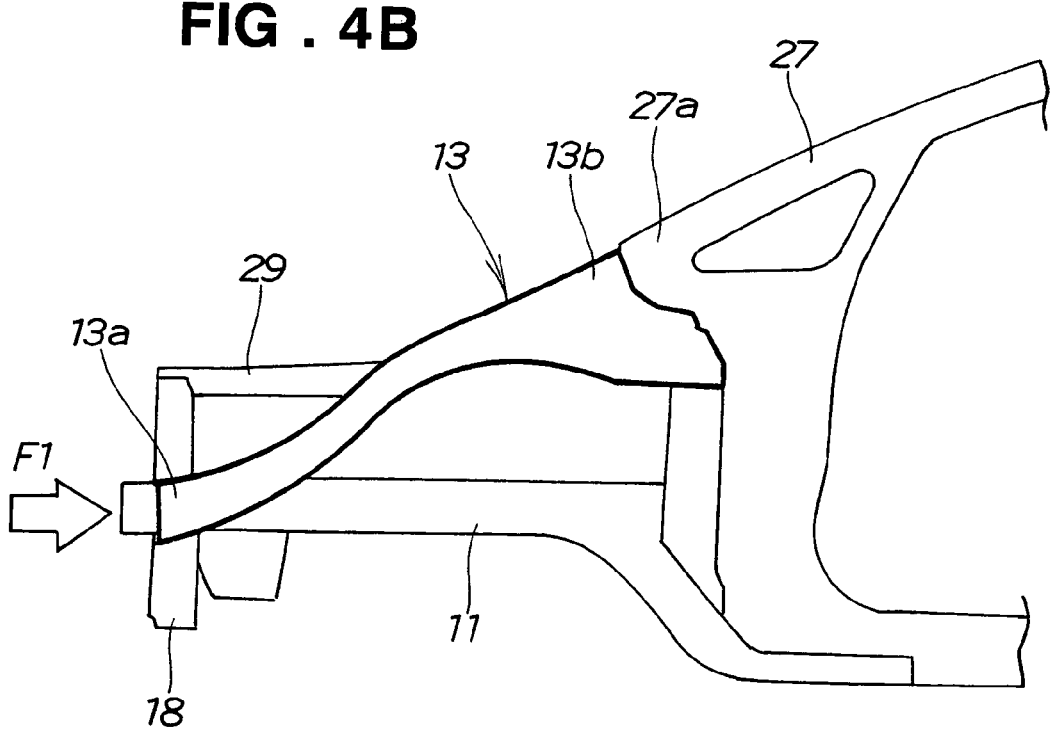

Operation of the vehicle front body structure 10 of the foregoing construction will be described with reference to FIGS. 4A-4B, 5A-5B and 6A-6B. FIGS. 4A and 4B diagrammatically illustrate, for comparative purposes, the behavior of a left upper member 150 in a comparative example and the behavior of the left upper member 13 of the present invention that are observed when the upper members 150, 13 are subjected to a front end collision.

As shown in FIG. 4A, the upper member 150 in the comparative example has a curvilinear configuration including a central portion 151 extending along an arcuate upper edge portion of the left front wheel house (not shown). The left upper member 150 is bent downward at an upper end 151a of the central portion 151 and further bent upward at a lower end 151b of the central portion 151. The central portion 151 in itself is generally straight and slopes steeply from a rear part (not designated) to a front part (not designated) of the left upper member 150.

When the left upper member 150 is subjected to a front end collision involving a backward force or load F1 acting on a front end portion 150a of the left upper member 150, the left upper member 150, due to its curvilinear configuration described above, is likely to yield or further bend at the upper and lower ends (bent portions) 151a, 151b of the central portion 151. With this yielding, the left upper member 150 cannot effectively distribute the load F1 to a left front pillar 152 of the vehicle body, thereby lowering the shock-absorbing efficiency of the vehicle front body structure.

On the other hand, as shown in FIG. 4B, the left upper member 13 of the present invention has a substantially straight or rectilinear configuration extending substantially straight or linearly from the front end portion 13a to the rear end portion 13b thereof. Furthermore, the left upper member 13 is arranged to slope upward in a backward direction of the vehicle body, and the rear end portion 13b is connected to the lower end 27a of the left front pillar 27.

When the left upper member 13 is subjected to a front end collision involving the backward force or load F1 acting on the front end portion 13a of the left upper member 13, the left upper member 13, owing to its rectilinear configuration, is able to withstand the load F1 without yielding and distributes the load F1 effectively to the left front pillar 27, thus increasing the shock-absorbing efficiency of the vehicle front body structure.

Figure 5A:
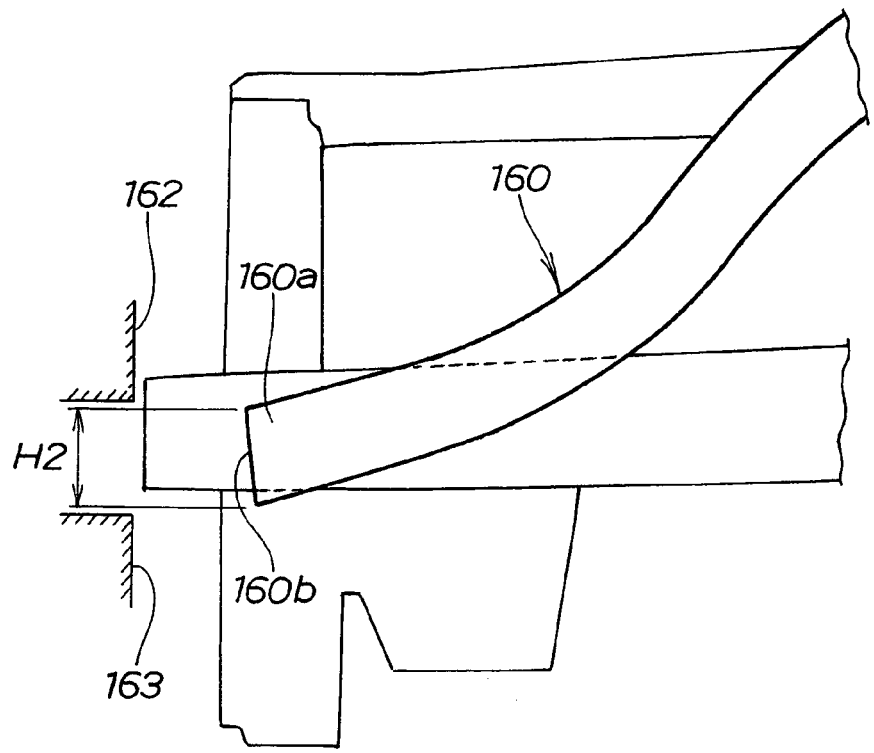
FIGS. 5A and 5B are side views diagrammatically showing, for comparative purposes, operations of a front end of the upper member according to a comparative example and a front end of the upper member according to the invention.
Figure 5B:
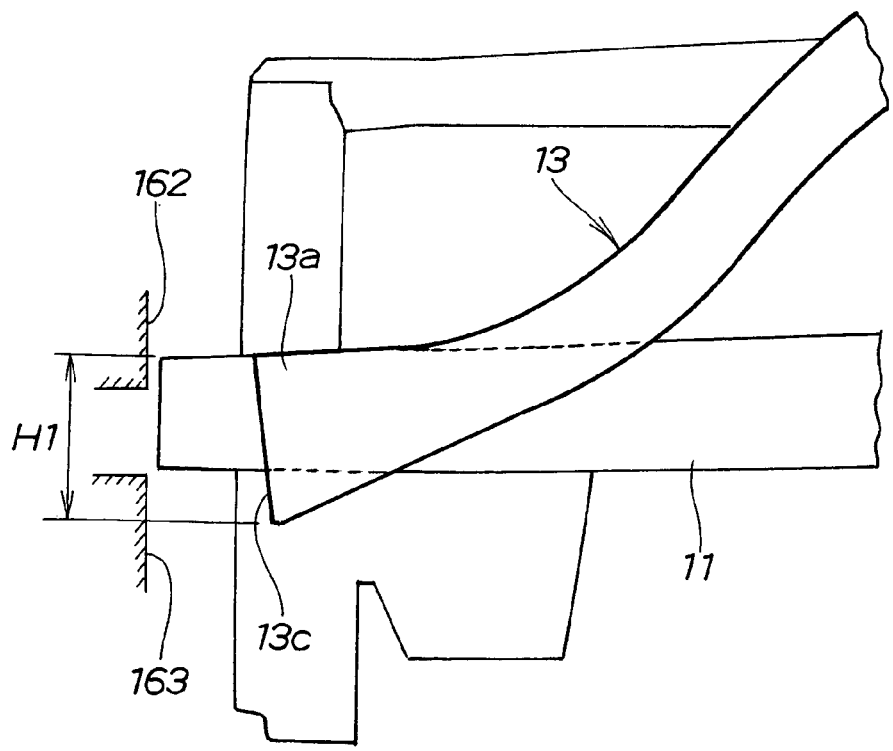

FIGS. 5A and 5B diagrammatically show, for comparative purposes, operations of a front end portion 160a of a left upper member 160 according to a comparative example and a front end portion 13a of the left upper member 13 according to the invention. In the comparative example shown in FIG. 5A, the front end portion 160a of the left upper member 160 has a uniform height H2 throughout the length thereof. On the other hand, according to the present invention shown in FIG. 5B, the front end portion 13a of the left upper member 13 is flared in a vertical direction toward a front end 13c thereof so that the front end 13c has a larger height than the remaining part of the left upper member 13. The height H1 of the front end 13c of the left upper member 13 of the invention is larger than the height H2 of the front end 160b of the left upper member 160 in the comparative example.

As indicated by hatching shown in FIGS. 5A and 5B, the level of a structural part of an oncoming vehicle, which forms a fore end of the oncoming vehicle when a collision occurs, varies depending on the type and/or model of the oncoming vehicle. In case of the comparative example shown in FIG. 5A, since the height H2 of the front end portion 160a is uniform throughout the length thereof and is smaller than the height H1 at the front end 13c of the upper member 13 of the invention, the front end portion 160 has a relatively small range of abutment relative to the structural part of the oncoming vehicle. Especially, when a collision occurs relative to a structural part 162 or 163 of the oncoming vehicle, the front end portion 160a of the upper member 160 cannot undertake reliable abutment with the structural part 162, 163 because the structural part 162, 163 lies in a plane either above an upper edge of the front end 160b, or below a lower edge of the front end 160b, of the front end portion 160a. This will result in insufficient distribution and hence absorption of an impact energy.

In case of the upper member 13 according to the present invention, the front end 13c of the front end portion 13a is enlarged in height, as shown in FIG. 5B, so that the front end portion 13a has a larger range of abutment relative to the structural part of the oncoming vehicle than the front end portion 160a in the comparative example of FIG. 5A does. Even at the time of a collision with the structural part 162 lying at a higher level or with the structural part 163 lying at a lower level, the front end portion 13a with vertically enlarged front end 13c can undertake reliable abutment with the structural part 162, 163. This will ensure efficient distribution of an impact force or load to the front pillar and resulting sufficient absorption of the impact energy.

Figure 6A:
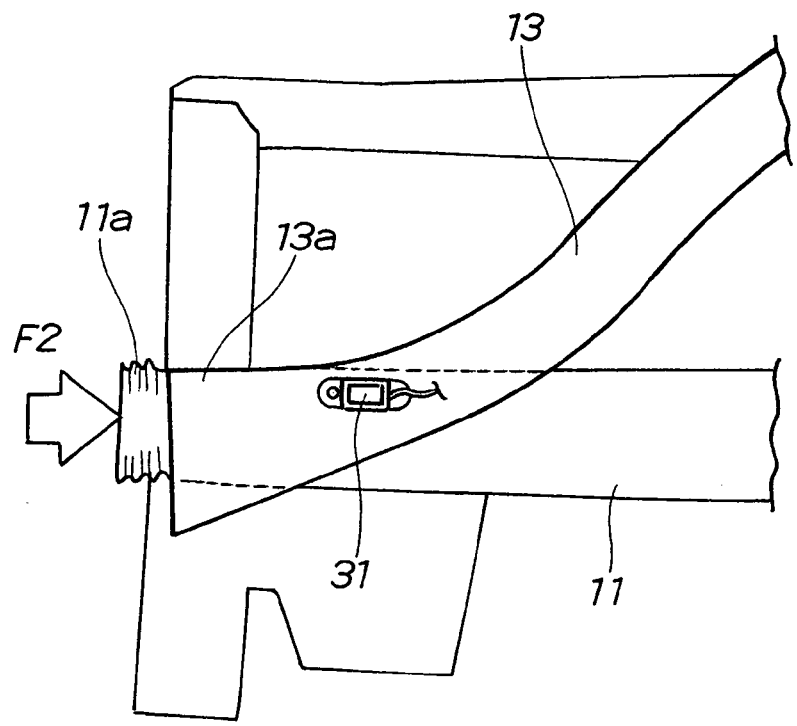
FIGS. 6A and 6B are side views illustrative of the operation timing of a sensor disposed on the upper member for activating an air-bag module.
Figure 6B:
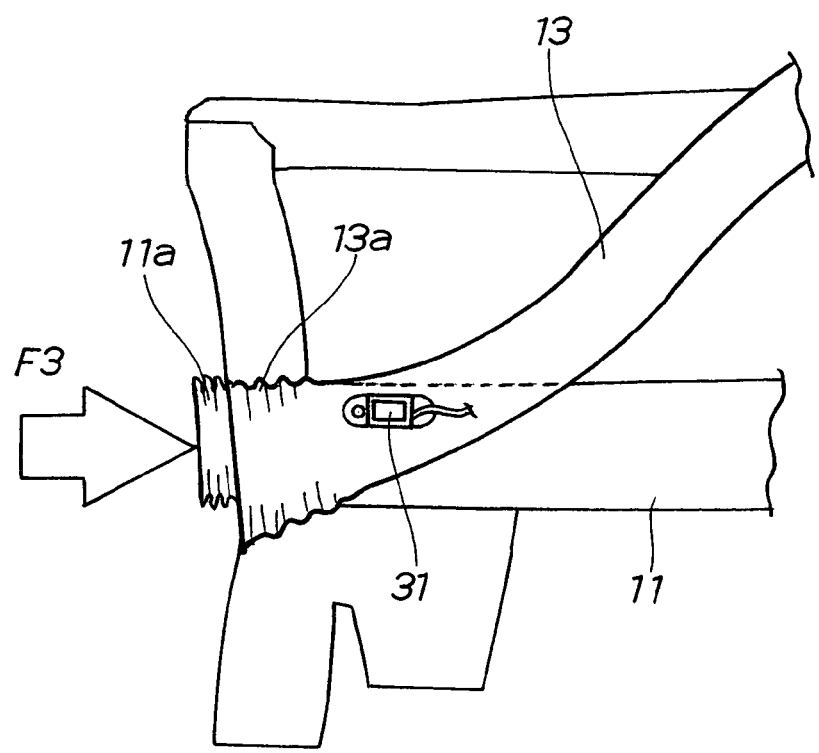
Figure 7:
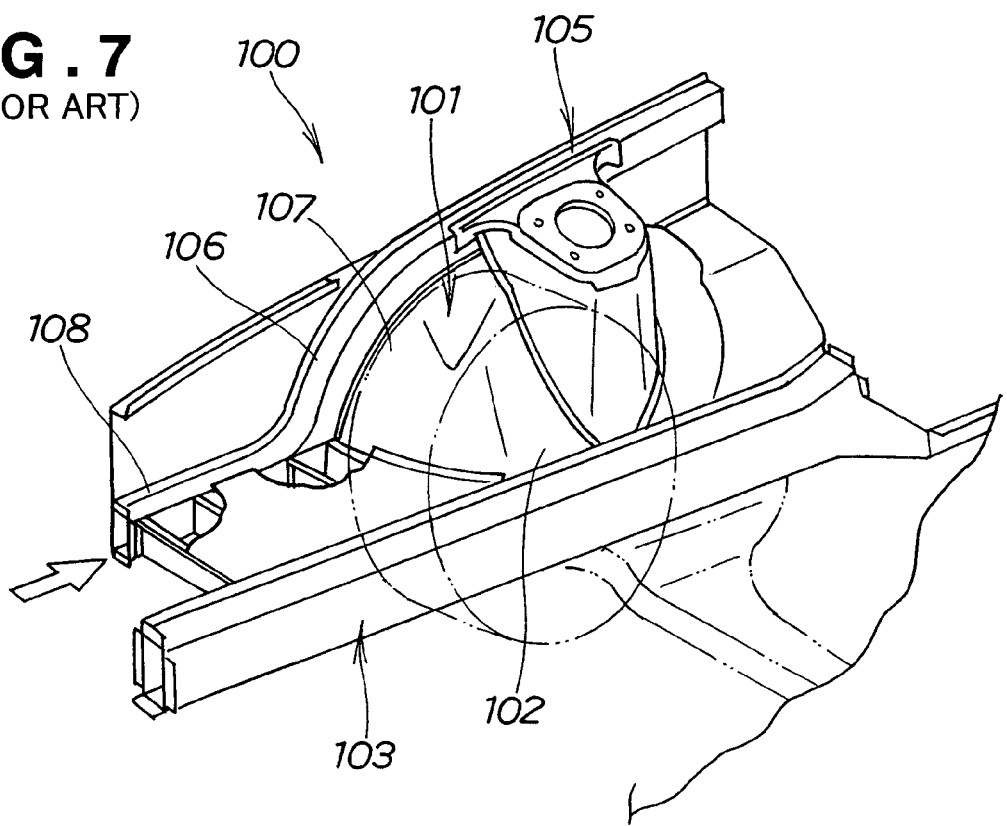
FIG. 7 is a fragmentary perspective view showing a conventional vehicle front body structure.
Figure 8:
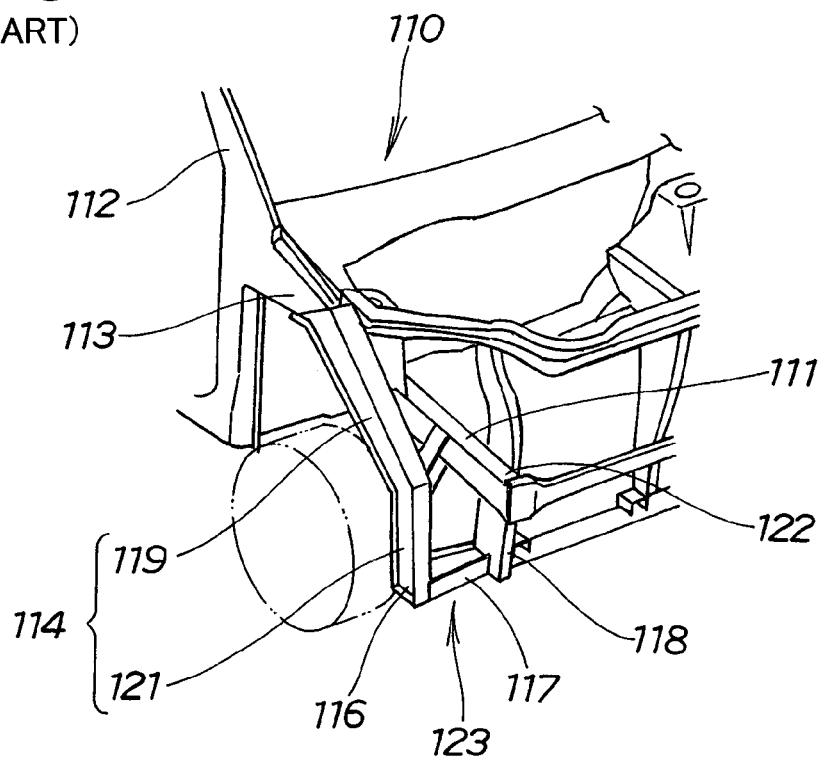
FIG. 8 is a view similar to FIG. 7, but showing another conventional vehicle front body structure.

FIGS. 6A and 6B are side views illustrative of the operation timing of the impact sensor 31 that is disposed on the left upper member for activating an air-bag module. As previously discussed, the front end portion 13a of the left upper member 13 is located rearward of the front end portion 11a of the left front side frame 11. Accordingly, the front end portion 13a of the left upper member 13 does not undergo deformation even when the front end portion 11a of the left front side fame 11 is slightly deformed, as shown in FIG. 6A, under the effect of a relatively small force or load F2 acting on the front end of the left front side frame 11. In this instance, since the force or load F2 is absorbed solely by the front end portion 11a through deformation or yielding of the latter and does not give any influence on the front end portion 13a of the left upper member 13, the impact sensor 31 provided in the vicinity of the front end portion 13a for activating the air-bag module (not shown) is not sensitive to the load F2 and hence is in the inactive state.

When the front end portion 11a of the left front side frame 11 is subjected to a relatively large force or load F3, as shown in FIG. 6B, the front end portion 11a undergoes complete deformation or yielding, causing the front end portion 13a of the left upper member 13 to start deformation or yielding under the effect of the backward force or load F3. The impact sensor 31 disposed in the vicinity of the front end portion 13a being deformed is now responsive to the load F3 and generates a detection signal to activate or evolve the air-bag module.

By thus providing the sensor 31 on the left upper member 13 in the vicinity of the front end portion 13a thereof that is located rearward of the front end of the left front side frame 11, it is possible to control operation of the sensor 31 such that the sensor 31 remains in its inactive state until the force acting on a front end of the vehicle body exceeds a predetermined value. This arrangement prevents accidental activation of the air-bag module which may otherwise occur when the vehicle front body structure is subjected to a relatively small impact force.

Obviously, various minor changes and modifications are possible in the light of the above teaching. It is to be understood that within the scope of the appended claims the present invention may be practiced otherwise than as specifically described.

What is claimed is:

1. A front body structure for a vehicle, comprising:
    a front side frame extending in a longitudinal direction of a body of the vehicle;
    a bumper beam extending in a transverse direction of the body of the vehicle;
    a front pillar disposed upwardly and rearwardly of the front side frame; and
    an upper member having upper and lower ends extending from attachment at the upper end with the front pillar to connection at the lower end to the bumper beam via a connecting member and the front side frame, said upper member having an upper part and a lower part including the lower end, said lower part being curved downward and said upper part being curved upward, said lower and upper parts with curvatures downward and upward, respectively, being such that the upper member in total has a rectilinear configuration and is arranged to slope upward in a rearward direction to said front pillar, the lower end of the upper member having a front end enlarged in a vertical direction so that the front end has a larger height than the remaining part of the upper member, the lower part of the upper member including a flared portion in vertical direction extending forwardly toward the vertically enlarged front end.

2. A front body structure according to claim 1, further comprising a sensor for activating an air-bag module, the sensor being disposed on the upper member in the vicinity of the front end thereof, the front end of the upper member being located rearward of a front end of the front side frame.

* * * * *